United States Patent
Wu et al.

(10) Patent No.: US 11,772,044 B2
(45) Date of Patent: Oct. 3, 2023

(54) WASTE WATER EVAPORATION METHODS AND APPARATUS

(71) Applicant: Mitsubishi Power Americas, Inc., Basking Ridge, NJ (US)

(72) Inventors: Song Wu, Livingston, NJ (US); Sandhya Eswaran, Basking Ridge, NJ (US); Allan Kukoski, Milford, NJ (US); Robert Nicolo, Leesburg, VA (US); Edward Bialkin, Lebanon, NJ (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 17/373,746

(22) Filed: Jul. 12, 2021

(65) Prior Publication Data
US 2021/0339161 A1    Nov. 4, 2021

Related U.S. Application Data

(62) Division of application No. 15/000,606, filed on Jan. 19, 2016, now Pat. No. 11,058,967.

(51) Int. Cl.
*B01D 53/83* (2006.01)
*B01D 1/16* (2006.01)
(Continued)

(52) U.S. Cl.
CPC .......... *B01D 53/83* (2013.01); *B01D 1/0058* (2013.01); *B01D 1/14* (2013.01); *B01D 1/16* (2013.01);
(Continued)

(58) Field of Classification Search
CPC .......... B01D 1/14; B01D 1/0058; B01D 1/16; B01D 1/18; B01D 1/20; B01D 3/346;
(Continued)

(56) References Cited

U.S. PATENT DOCUMENTS

| | | | | |
|---|---|---|---|---|
| 2012/0211421 A1* | 8/2012 | Self | ...................... | B01D 61/025 210/205 |
| 2012/0237423 A1* | 9/2012 | Bialkin | ................ | B01D 53/346 423/240 R |
| 2015/0139882 A1* | 5/2015 | Warren | .................. | F23J 15/003 423/244.07 |

FOREIGN PATENT DOCUMENTS

| | | | | |
|---|---|---|---|---|
| KR | 20090083695 A | * | 8/2009 | ......... B01D 39/2068 |
| KR | 101426333 B1 | * | 8/2014 | ............. B01D 45/12 |
| WO | WO-2015113628 A1 | * | 8/2015 | ............. B01D 53/12 |

OTHER PUBLICATIONS

KR101426333B1_ENG (Espacenet machine translation of Park) (Year: 2014).*

(Continued)

*Primary Examiner* — Gabriel E Gitman
(74) *Attorney, Agent, or Firm* — Straub & Straub; Michael P. Straub; Stephen T. Straub

(57) ABSTRACT

A waste water processing system includes an upflow contacting column having a flue gas input for receiving flue gas having a temperature of at least 500 degrees F., a waste water input, and a flue gas output. The waste water input is coupled to a fluid injector, e.g., atomizing nozzles, positioned in the throat of a Venturi portion of the upflow contacting column or in a sidewall of the throat of the Venturi portion of the upflow contacting column. The flue gas in the upflow contacting column has a high velocity, e.g., a gas velocity exceeding 65 fps in the throat of the Venturi portion of the upflow contacting column at a position where the fluid injector is located. Drying additives such as recycled ash, lime, and/or cement may be, and sometimes are, input into the upflow contacting column downstream of the waste water input.

10 Claims, 7 Drawing Sheets

(51) Int. Cl.
- *B01D 53/14* (2006.01)
- *B01D 3/34* (2006.01)
- *B01D 1/00* (2006.01)
- *C02F 1/16* (2023.01)
- *B01D 1/14* (2006.01)
- *C02F 1/12* (2023.01)
- *C02F 1/10* (2023.01)
- *B01D 53/78* (2006.01)
- *B01D 1/18* (2006.01)
- *B01D 1/20* (2006.01)
- *C02F 1/04* (2023.01)
- *B01D 53/75* (2006.01)
- *B01D 53/48* (2006.01)
- *C02F 103/18* (2006.01)

(52) U.S. Cl.
CPC ............... *B01D 1/18* (2013.01); *B01D 1/20* (2013.01); *B01D 3/346* (2013.01); *B01D 53/78* (2013.01); *C02F 1/048* (2013.01); *C02F 1/10* (2013.01); *C02F 1/12* (2013.01); *C02F 1/16* (2013.01); *B01D 53/1456* (2013.01); *B01D 53/1481* (2013.01); *B01D 53/48* (2013.01); *B01D 53/75* (2013.01); *B01D 2258/0283* (2013.01); *C02F 2103/18* (2013.01)

(58) Field of Classification Search
CPC ............... B01D 53/14; B01D 53/1456; B01D 53/1481; B01D 53/34; B01D 53/46; B01D 53/48; B01D 53/50; B01D 53/75; B01D 53/78; B01D 53/79; B01D 53/83; B01D 2258/0283; C02F 1/048; C02F 1/10; C02F 1/12; C02F 1/16; C02F 2103/18; B01J 10/00; B01J 19/26; B04C 3/06; B01F 25/312
See application file for complete search history.

(56) References Cited

OTHER PUBLICATIONS

KR20090083695A_ENG (Espacenet machine translation of Hong) (Year: 2009).*

* cited by examiner

WASTE WATER EVAPORATION METHODS AND APPARATUS

RELATED APPLICATIONS

The present application is a divisional of U.S. patent application Ser. No. 15/000,606 filed Jan. 19, 2016 which was Published on Jul. 20, 2017 as Publication No.: US 2017-0203976 A1 and which is hereby expressly incorporated by reference in its entirety.

FIELD

The present application relates to waste water processing methods and apparatus, more particularly, to waste water processing using evaporation to remove undesirable pollutants from waste water.

BACKGROUND

Fossil fuels such as various types of coals are a major energy source for industrial facilities such as power plants. Combustion of fossil fuels releases pollutants, mostly present in the gaseous combustion products of flue gas. Modern fossil fuel plants are typically equipped with multiple pollution control devices such as a selective catalytic reduction (SCR) device and/or a selective non-catalytic reduction (SNCR) device for destruction (reduction) of NOx and FF or ESP for separation of particulate matter, and a flue gas desulfurization (FGD) device for absorption and neutralization of SO2 and other acid gases. A wet FGD (WFGD) is commonly the last stage of an air quality control system (AQCS) for power plant.

The wet FGD, by contacting the flue gas with an alkaline solution or slurry, effectively captures SO2, other acidic gases, as well as a portion of the particulate matter carried in the flue gas. It also captures trace pollutants such as mercury, selenium and arsenic, in either gaseous form or particulate form, which can accumulate in the FGD liquid over time. The FGD waste water, which is from the blowdown stream of the FGD and contains these trace pollutants as well as higher concentrations of chlorides, nitrates/nitrites, etc., must be treated to remove these contaminants before being discharged into the environment. The recently released standards in the US call for limits of arsenic and selenium at part per billion (ppb) levels and mercury at part per trillion (ppt) levels for power plant effluent. These new limits would require the waste water to go through conventional physical—chemical treatment followed by biological treatment, a process that is expensive to install and has strict operating requirements for the quality/chemistry of the waste water to be treated.

An alternative approach to treating the waste water is to evaporate the waste water and turn the suspended and dissolved impurities into dry solids. U.S. Pat. No. 8,388,917 teaches a method in which the FGD wastewater is introduced and evaporated in various parts of the power plant process upstream of, downstream of, or inside the boiler furnace. While U.S. Pat. No. 8,388,917 describes some approaches for evaporating waste water, there is a need for new methods and apparatus for treating waste water using evaporation which are compact and/or easy to implement and/or operate, e.g., especially regarding retrofitting existing power plants, and/or which provide additional flexibility for handling of byproduct from drying.

SUMMARY

Various methods and apparatus are directed to a new process for evaporating waste water that utilizes a high velocity, entrained flow, upflow contacting column.

Various features allow the upflow contacting column to be implanted in a compact form when space is an issue. The contacting column can be inexpensive to build and easy to operate. Various exemplary methods and apparatus provide means to prepare and condition the solid products from drying for good flowability and safe disposal.

In various embodiments, in accordance with the present invention, waste water such as blowdown water from a wet flue gas desulfurization (WFGD) device is introduced through atomizing nozzles as fine droplets into the lower part of a vertical, upflow Venturi contacting column. A stream of hot gas, which can be, and in some embodiments is, a slipstream of power plant flue gas, is introduced through the bottom of the upflow contacting column as the heat source for evaporation. The hot gas that flows through the upflow contacting column flows at a sufficiently high velocity, so that waste water droplets and any particulate matter inherent in the flue gas or otherwise added are fully entrained in the gas flow. In addition, in various embodiments, the velocity range in the upflow contacting column is at a relatively high speed compared to other approaches so that the solids do not drop out while in the upflow contacting column.

In some but not necessarily all embodiments the flue gas flows at a rate>30 ft/s at a top of the cylindrical section in some embodiment and >65 ft/s at a lower cylindrical section, i.e., "the throat". In some such embodiments, the hot gas velocity is >110 fps at the lower cylindrical section of the upflow contacting column. Such flow rates are exemplary with other flow rates being possible.

The Venturi configuration, in accordance with one feature of the present invention, promotes dispersion of atomized waste water droplets, as well as any introduced particulate matter, into the gas stream for improved heat and mass transfer during drying.

The upflow contacting column, in accordance with various embodiments, of the present invention, has sufficient height to allow complete evaporation of the waste water droplets. The gas phase residence time of the contacting column, in some embodiments, is in the range of 0.5-5 seconds. In some other embodiments, the gas phase residence time of the contacting column is in the range of 0.5-3 seconds. In still other embodiments, the gas phase residence time of the contacting column is in the range of 1-2.5 seconds. Fly ash from the combustion of fossil fuels and, if needed, additives such as lime or cement, are introduced to a lower part of the upflow Venturi contacting column to accelerate the drying process and dispersion of the drying product. The introduction of recycled flyash and additives such as lime or cement improves flowability and handling properties of the drying product, and stabilizes the dry waste to prevent release of trace pollutants during disposal. The flyash and additives injected in this process, in some embodiments, are in a fine powered form, e.g., with most of the material below 150 microns in size. In some embodiments, most of the material, e.g., flyash and additives, which are injected into the upflow contacting column, have particle sizes in the range of 10 to 150 microns.

After drying, the gas flow with the entrained solids from the contacting column is introduced into a particulate collection device, where the entrained particulate matter including the product from the drying of wastewater is separated from the gas flow. A part of the particulate matter can be, and in some embodiments is, collected and recycled to the contacting column.

In a typical power plant application, the heat source for drying is a slipstream of hot flue gas extracted from the main flue gas duct. The slipstream is typically extracted upstream of the air heater where the flue gas temperate is typically in the range of 600-800 degrees F. In the upflow contacting column the flue gas is cooled to around 300 degrees F., or in the range of 200-500 degrees F.

Various methods and apparatus in accordance with the present invention are well suited for use in power plants, e.g., coal-fired power plants where wet FGDs are used and waste water is generated from the wet FGDs. Various method and apparatus in accordance with the present invention are well suited for evaporating WFGD waste water and/or other waste water streams containing high concentrations of dissolved and/or suspended solids. The waste water and hot flue gas (heat source) do not need to be, and in some embodiments, are not from the same operating unit. For instance, in some embodiments, waste water from surface impoundments is combined and mixed before injection into the proposed process or injected separately into the process.

Various embodiments, in accordance with the present invention, implement a process for evaporating waste water that improves upon prior art approaches. Various embodiments, in accordance with the present invention, utilize low grade heat energy from a small slipstream flue gas extracted between the boiler and the air heater. In some such embodiment, the amount of extraction is typically less than 10% but not more than 25% of the total boiler flue gas. Some embodiments, in accordance with the present invention, utilize a high velocity, entrained upflow contacting column with a Venturi configuration to allow compact equipment size, good dispersion and mixing, and enhanced heat and mass transfer. Various embodiments, in accordance with the present invention, introduce recycled ash and additives such as lime or cement to the upflow contacting column to enhance the drying process and to be rapidly mixed with drying products to improve the flowability and handling properties, and to stabilize the dry waste to prevent the release of trace pollutants during disposal.

An exemplary waste water processing system, in accordance with some embodiments, includes: an upflow contacting column having a flue gas input for receiving flue gas having a temperature of at least 500 degrees F., a waste water input and a flue gas output, said waste water input being coupled to a fluid injector positioned in a throat of a Venturi portion of said upflow contacting column or in a sidewall of the throat of the Venturi portion of said upflow contacting column, said flue gas having a flue gas velocity exceeding 65 fps in said throat of the Venturi portion of said upflow contacting column at a position where the fluid injector is located. An exemplary method of operating a waste water processing system, in accordance with some embodiments, includes: operating an upflow contacting column having a flue gas input to receive flue gas having a temperature of at least 500 degrees F.; operating the upflow contacting column to receive waste water at a waste water input; operating the upflow contacting column to inject the waste water received at the waste water input into flue gas passing through said upflow contacting column via a fluid injector positioned in a throat of a Venturi portion of said upflow contacting column or in a sidewall of the throat of the verturi portion of said upflow contacting column at a position where said flue gas passing through the upflow contacting column has a flue gas velocity exceeding 65 fps; and discharging flue gas from said upflow contacting column via a flue gas output of said upflow contacting column.

Numerous additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

DETAILED DESCRIPTION

Figure 1:
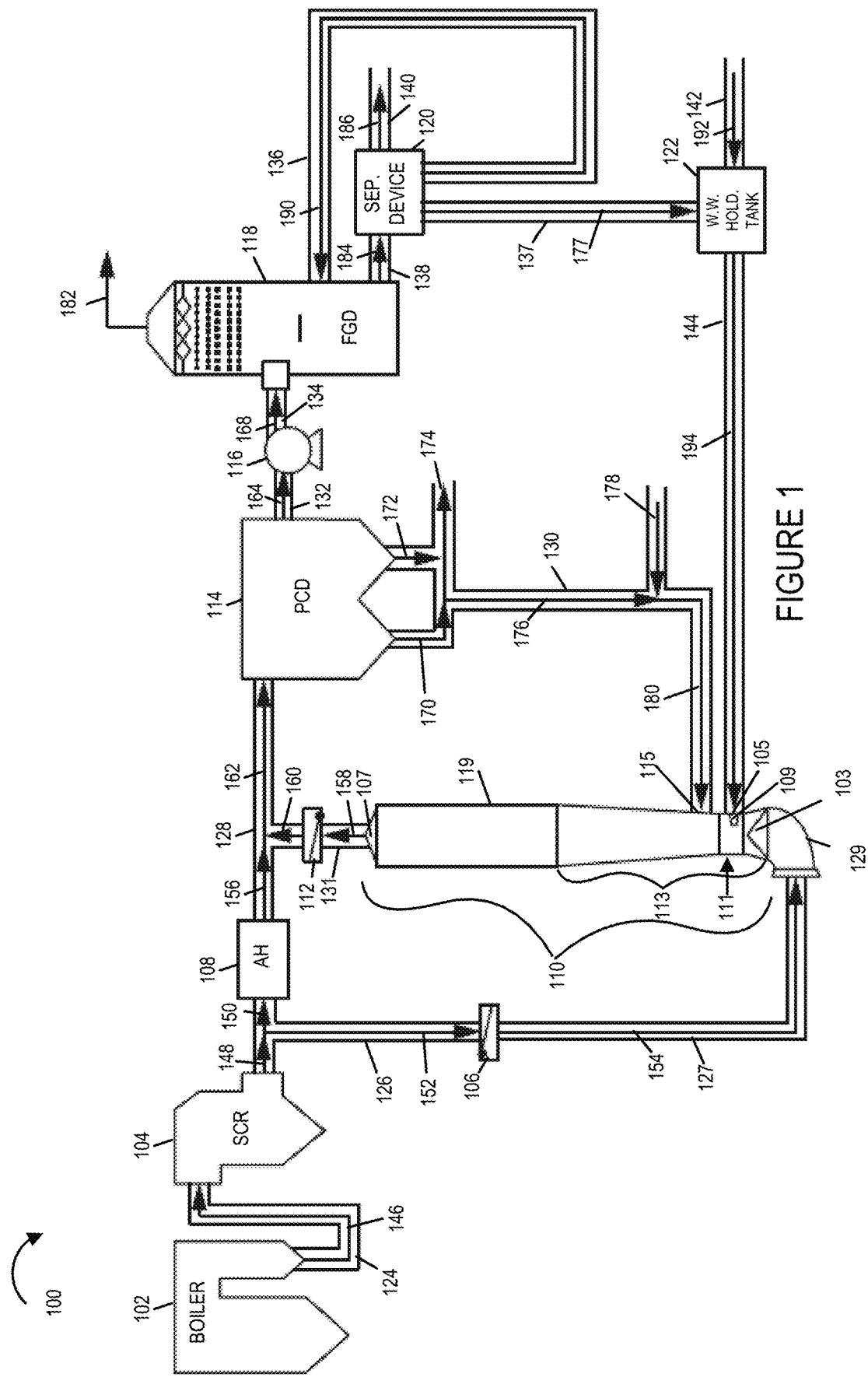
FIG. 1 is a drawing of an exemplary waste water processing system in which a mixed additive is input into an upflow contacting column in accordance with an exemplary embodiment.

FIG. 1 is a drawing 100 of an exemplary waste water processing system 100 in accordance with an exemplary embodiment. Exemplary waste water processing system 100 includes a boiler 102, a selective catalytic reduction (SCR) apparatus 104, an air heater (AH) 108, an upflow contacting column 110, a particulate collection device (PCD) 114, a draft fan 116, a wet flue gas desulfurization (FGD) apparatus 118, a separation device 120, and a waste water holding tank 122. In various embodiments, the PCD 114 is one of an electrostatic precipitator or a bag filter.

The boiler 102 output is coupled to an input of SCR apparatus 104 via duct 124 through which output flue gas 146 flows. The SCR apparatus 104 receives flue gas 146, processes the received flue gas, e.g., performing a selective catalytic reduction operation, and outputs flue gas 148, said flue gas 148 includes flyash. The output of SCR 104 is coupled to an input of AH 108 and to a flue gas input 103 of the upflow contact column 110. Duct 126 couples the output of SCR apparatus 104 to the input of AH 108 and to the input of damper 106. A first portion 150 of the flue gas 148 is input to the AH 108; a second portion 152 of flue gas 148 flows toward the upflow contacting column 110 and is input to the first damper 106. Flue gas 154, which is an output of damper 106, flows through duct 127, through connecting elbow 129 and enters the upflow contacting column 110 via flue gas input 103. The first damper 106 is located between a source of the flue gas, e.g., SCR 104, and the flue gas input 103 of the upflow contacting column 110.

In various embodiments, a few percent of the total combustion flue gas, e.g., 6%, 7% or 8% of the total combustion gas being output by a power plant is directed to the slipstream corresponding to the upflow contacting column 110. For example flue gas flow 126 directed toward upflow contacting column input 103 is approximately 6%, 7% or 8% of flue gas flow 148 being output from the SCR 104, while flue gas flow 150 directed to the input of the air heater 108 is 94%, 93% or 92% of the flue gas flow 148 being output by the SCR 104.

The upflow contacting column 110 includes flue gas output 107, which is coupled to a duct 131, which is coupled to a second damper 112. The second damper 112 is located between the flue gas output 107 of the upflow contacting column 110 and the flue gas duct 128 which directs flue gas output of the air heater into the particulate collection device 114. Duct 128 couples the output of air heater 108 and the output of the second damper 112 to the input of PCD 114. Flue gas 158 which is output from output 107 of upflow contacting column 110 passes through second damper 112 and emerges as flue gas 160, which is combined with output flue gas 156, from AH 108, in duct 128 to become flue gas 162 which is input to PCD 114. Thus flue gas output from the upflow contacting column is coupled to flue gas duct 128 which directs a flue gas output of the air heater 108 into particulate collection device 114.

Duct 132 couples an output of PCD 114 to an input of draft fan 116, and the output of draft fan 116 is coupled to the input of FGD apparatus 118 via duct 134. Flue gas 164 emerges from PCD 114, enters draft fan 116 and emerges as flue gas 168 which enters an input of FGD apparatus 118, which processes the input flue gas 168. Stack gas 182 emerges from FGD apparatus 118.

Piping 130 couples an ash output of the PCD 114 to the additive input 115 of upflow contact column 110. Ash (170, 172) is output from the PCD 114. A first portion of ash 170, represented as ash flow 176 is routed toward additive input 115 of upflow contacting column 110. The ash flow 176 is combined with input lime 178, and a combined flow 180 of recycled ash mixed with lime is input to the upflow contacting column 110 via additive input 115. A second portion of ash 170 from the PCD 114 is combined with ash 172, as represented by ash flow 174 and the combined ash flow 174 is routed for conditioning and/or disposal.

Piping 138 couples an output of FGD apparatus 118 to the input of separation device 120. Piping 136 couples an output of separation device 120 and to an input of FGD apparatus 118. Piping 137 couples an output of separation device 120 to an input of waste water holding tank 122. Piping 142 couples other water sources to an input waste water holding tank 122. Piping 144 couples an output of waste water holding tank 122 to upflow contacting column 110.

The upflow contacting column 110 is used as an upflow Venturi reactor. The upflow contacting column 110 includes flue gas input 103 for receiving a flue gas 154 having a temperature of at least 500 degrees F. In some embodiments, the temperature of flue gas 154 is approximately 700 degrees F. The upflow contacting column 110 takes in flue gas flow 126 tapped off before the air heater 108 so that the upflow contacting column 110 is able to use the hot gas as a heat source to evaporate waste water which is fed into the upflow contacting column 110. The Venturi design of the upflow contacting column 110 facilitates high gas velocity. The high gas velocity is good for drying, heat transfer and turbulence. The upflow contacting column 110 further includes a waste water input 105 for receiving waste water flow 194 from waste water holding tank 122 and a flue gas output 107 for outputting flue gas 158 toward particle collection device 114. The waste water input 105 is coupled to a fluid injector 109 positioned in a throat 111 of a Venturi portion 113 of the upflow contacting column 110 or in a sidewall of the throat 111 of the Venturi portion 113 of the upflow contacting column 110. In some embodiments, the fluid injector 109 includes a nozzle or nozzles, e.g., atomizing nozzles, and droplets of waste water are injected into the upflow contacting column 110. In some embodiments, the droplets are in the size range of 10's of microns to up to 100 microns. The atomized water evaporates in the upflow contacting column 110. The flue gas within the upflow contacting column has a flue gas velocity exceeding 65 fps in the throat 111 of the Venturi portion 113 of the upflow contacting column 110 at a position where the fluid injector 109 is located.

The upflow contacting column flue gas output 107 is coupled, via duct 131 and damper 112, to flue gas duct 128. Duct 128 directs a flue gas output from air heater 108 combined with flue gas output from upflow contacting column 110, which has passed through the damper 112, into the particulate collection device 114. Flue gas 158 is output from upflow contacting column 110 and an input into duct 131; flue gas 160 is output from damper 112 and an input into duct 128; flue gas 156 is output from AH 108 and an input into duct 128; and flue gas 162 represents combined flue gas 156 and flue gas 160, which has been combined in duct 128 and is input to PCD 114. The second damper 112 is located between the flue gas output 107 of the upflow contacting column 110 and the flue gas duct 128 which directs flue gas output 156 of the air heater into the particulate collection device 114. Flue gas 158 is on the input side of second damper 112 and flue gas 160 is on the output side of damper 112. Flue gas 162 represents a combined flow of flue gas 156 from AH 108 and flue gas 160 from upflow contacting column output 107.

In some embodiments, the temperature of the flue gas 158 output by the upflow contacting column 110 is approximately the temperature the flue gas 156 output by the air heater 108, e.g., the temperature of flue gas 158 which is output from the upflow contacting column is within 150 degrees F. of the flue gas 156 which is output from the air heater 108. In one exemplary embodiment, the flue gas 158 is approximately 300 degrees F.

Output flow 184 from FGD apparatus 118 travels through pipe 138 and enters separation device 120. Separation device 120 processes the received flow 184 and outputs filter cake 186 via pipe 140, recycled water 190 via pipe 136, and FGD blowdown 177 via pipe 137. The recycled water 190 is directed back into the FGD apparatus 118. The FGD blowdown 177 is directed into the waste water holding tank 122. The waste water holding tank 122 combines the FGD blowdown 177 with other input waste water 192, which has been received via pipe 142. The waste water holding tank 122 outputs fluid 194 including waste water and FGD blowdown via pipe 144, which is directed to the waste water input 105 of the upflow contacting column 110 and injected into the upflow contacting column 110 via fluid injector 109.

In some embodiments, the waste water input 105 receives waste water having suspended solids and dissolved solids. In some embodiments, the flue gas output 107 outputs flue gas including water vapor and a solid waste product, the solid waste product comprising of solids derived from the waste water and the fly ash carried in the flue gas input 103. In some embodiments, the solid waste product has less than 6% water content.

The additive input 115 of the upflow contacting column 110 is downstream of the fluid 109 for the waste water input 105. The additive input is placed at a good location in the upflow contacting column 110 to mix a drying product, e.g., a fine powder drying product, into the flue gas flow including injected waste water droplets which are being evaporated. The input additive drying production mixes well to produce a dry homogenous waste product. In various embodiments, the additive received via the additive input includes one or more of recycled ash, lime, and cement. In various embodiments, the additive input to the upflow contacting column 110 via additive input 115 includes ash, e.g., recycled ash, obtained from particulate collection device 114. In some embodiments, a large portion, e.g., 50%-70%, of the recycled ash is calcium chloride which can absorb water and facilitate drying. In various embodiments, the particulate collection device, e.g., PCD 114, from which ash is obtained, processes the majority of the flue gas generated by a power plant in which said waste water processing system is being used.

The upflow contacting column 110 includes a cylindrical portion 119 downstream of the Venturi portion 113, and the cylindrical portion has a flue gas minimum velocity of at least 30 feet per second, e.g., to avoid particles dropping out of the flue gas. In various embodiments, the upflow contacting column 110 has a length extending from the waste water injector 109 to the flue gas output 107 sufficient to cause a flue gas resident time in the upflow contacting column 110 of at least 0.5 seconds.

In the configuration of FIG. 1, which illustrates an exemplary waste water evaporation process including an upflow contacting column 110 in an exemplary system 100 in accordance with some embodiments of the present invention, the gas flow from the contacting column with entrained particulate matter (158, 160, a portion of 162) is introduced into PCD 114 that is shared with the main power plant. Since the slipstream flue gas (152, 154) was taken from the main power plant, cooled in the contacting column 110 and sent back (toward the PCD 114), the PCD of an existing power plant can be used as PCD 114. The mass and volume flow of flue gas and the particulate loading in the configuration of FIG. 1 will only be marginally higher than those seen by the PCD without the added evaporation process, e.g., a configuration without the upflow contacting column 110 (typically less than 2% and less than 20% respectively.) An additive such as lime 178 is added first to the recycled ash stream 176, and then together introduced, as stream 180, into the bottom section of the contacting column 110 at inlet 115. A part of the particulate matter collected in the PCD is recycled to the contacting column as recycled ash stream 176 which becomes a portion of stream 180. Alternatively, in some embodiments, the additive 178, e.g., lime, is introduced at a flue gas inlet into the PCD 114.

Figure 2:
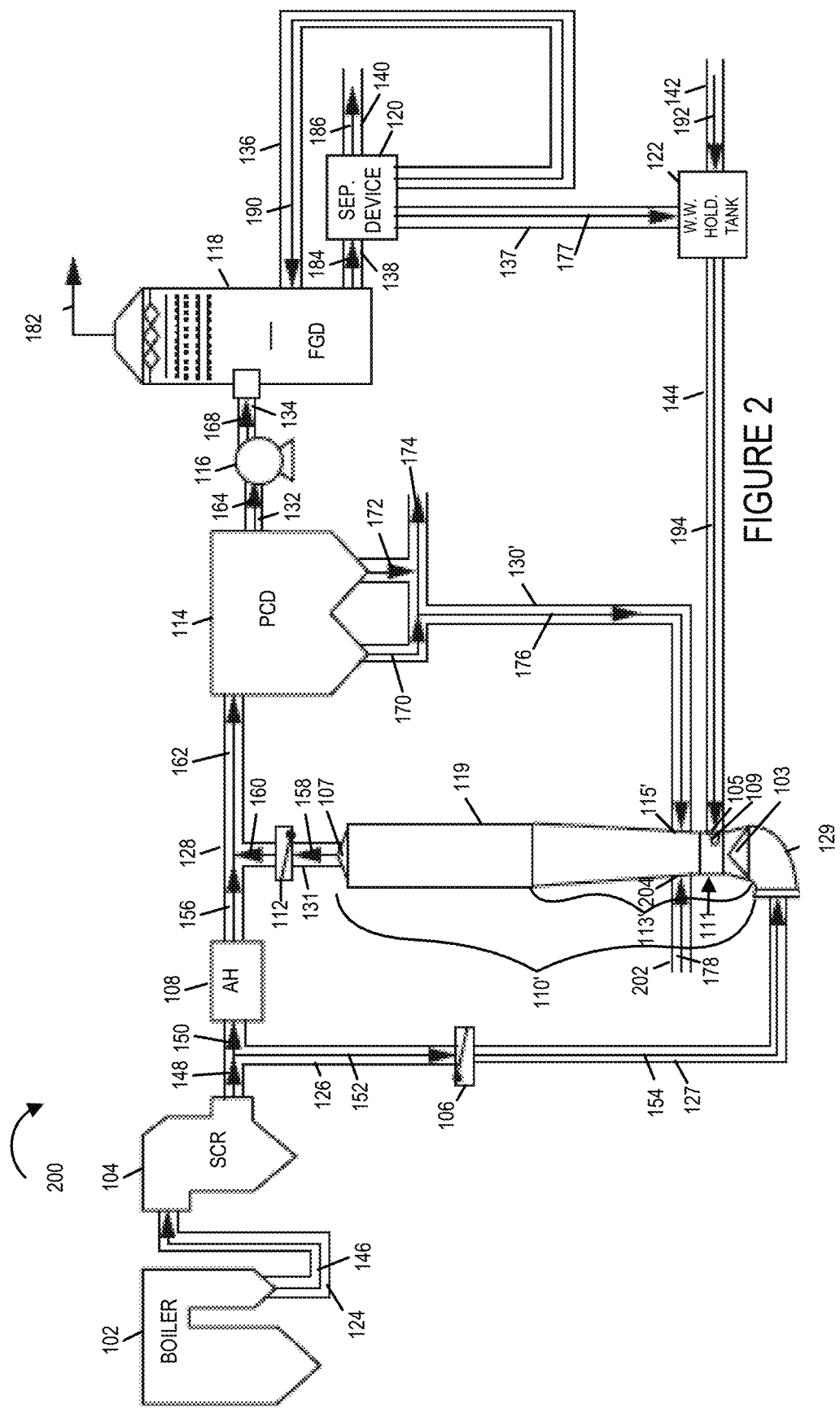
FIG. 2 is a drawing of an exemplary waste water processing system in which different additives are input via different inputs into an upflow contacting column in accordance with another exemplary embodiment.

FIG. 2 is a drawing 200 of an exemplary waste water processing system 200 in accordance with another exemplary embodiment. In the exemplary embodiment of FIG. 2, different additives are injected into an upflow contacting column via different inputs (115', 204) of the upflow contacting column 110'. Exemplary waste water processing system 200 includes a boiler 102, a selective catalytic reduction (SCR) apparatus 104, an air heater (AH) 108, a upflow contacting column 110', a particulate collection device (PCD) 114, a draft fan 116, a flue gas desulfurization (FGD) apparatus 118, a separation device 120, and a waste water holding tank 122.

The boiler 102 output is coupled to an input of SCR apparatus 104 via duct 124 through which output flue gas 146 flows. In this embodiment, the output of the SCR 104 is the source of the flue gas tapped off and sent to the upflow contacting column 110'. In some other embodiments, the SCR 104 is omitted and the output of the boiler 102 is the source of the flue gas which is tapped off and sent to the upflow contacting column 110'. The SCR apparatus 104 receives flue gas 146, processes the received flue gas, e.g., performing a selective catalytic reduction operation, and outputs flue gas 148, said flue gas 148 including flyash. The output of SCR 104 is coupled to an input of AH 108 and to an input 103 of the upflow contacting column 110'. Duct 126 couples the output of SCR apparatus 104 to the input of AH 108 and to the input of first damper 106. A first portion 150 of the flue gas 148 is input to the AH 108; a second portion 152 of flue gas 148 flows toward the upflow contacting column 110' and is input to the first damper 106. Flue gas 154, which is an output of first damper 106, flows through duct 127, through connecting elbow 129 and enters the upflow contacting column 110' via flue gas input 103.

The upflow contacting column 110' includes flue gas output 107, which is coupled to a duct 131, which is coupled to a second damper 112. Duct 128 couples the output of air heater 108 and the output of the second damper 112 to the input of PCD 114. Flue gas 158 which is output from output 107 of upflow contacting column 110' passes through damper 112 and emerges as flue gas 160, which is combined with output flue gas 156, from AH 108, in duct 128 to become flue gas 162 which is input to PCD 114. Thus flue gas output 107 of the upflow contacting column 110' is coupled to flue gas duct 128 which directs a flue gas output of the air heater 108 into particulate collection device 114.

In various embodiments, the temperature of the flue gas 158 output by the upflow contacting column 110' is approximately the temperature of the flue gas 156 output by the air heater 108, e.g., the temperature of the flue gas 158 is within 150 degrees of the temperature of the flue gas 156.

Duct 132 couples an output of PCD 114 to an input of draft fan 116, and the output of draft fan 116 is coupled to the input of FGD apparatus 118 via duct 134. Flue gas 164 emerges from PCD 114, enters draft fan 116 and emerges as flue gas 168 which enters an input of FGD apparatus 118, which processes the input flue gas 168. Stack gas 182 emerges from FGD apparatus 118.

Piping 130' couples an ash output of the PCD 114 to the additive input 115' of upflow contact column 110'. Ash (170, 172) is output from the PCD 114. A first portion of ash 170, represented as ash flow 176 is routed toward first additive input 115' of upflow contacting column 110'. The ash flow 176, e.g., recycled ash, is input to the upflow contacting column 110' via first additive input 115'. A second portion of ash 170 from the PCD 114 is combined with ash 172, as represented by ash flow 174 and the combined ash flow 174 is routed for conditioning and/or disposal.

In this exemplary embodiment, the upflow contacting column 110' includes a second additive input 204. Lime 178 travels through pipe 202 and is input to the upflow contacting column 110' via second additive input 204. In some other embodiments, the second additive is cement instead of lime. In some embodiments, the upflow contacting column includes three additive inputs, e.g., a first additive input for recycled ash from a PCD, a second additive input for lime, and a third additive input for cement. In various embodiments, each of the included additive inputs, e.g., first additive input 115' and second additive input 204, in the upflow contacting column 110' are located downstream of the fluid injector 109 for waste water input.

Piping 138 couples an output of FGD apparatus 118 to the input of separation device 120. Piping 136 couples an output of separation device 120 and to an input of FGD apparatus 118. Piping 137 couples an output of separation device 120 to an input of waste water holding tank 122. Piping 142 couples other waster sources to an input waste water holding tank 122. Piping 144 couples an output of waste water holding tank 122 to upflow contacting column 110'.

The upflow contact column 110' includes flue gas input 103 for receiving a flue gas 154 having a temperature of at least 500 degrees F. In some embodiments, the temperature of flue gas 154 is approximately 700 degrees F. The upflow contact column 110' further includes a waste water input 105' for receiving waste water flow 194 from waste water holding tank 122 and a flue gas output 107 for outputting flue gas 158 toward particle collection device 114. The waste water input 105 is coupled to a fluid injector 109 positioned in a throat 111 of a Venturi portion 113 of the upflow contacting column 110' or in a sidewall of the throat 111 of the Venturi portion 113 of the upflow contacting column 110'. The flue gas within the upflow contacting column 110' has a flue gas velocity exceeding 65 fps in the throat 111 of the Venturi portion 113 of the upflow contacting column 110' at a position where the fluid injector 109 is located.

The upflow contacting column flue gas output 107 is coupled, via duct 131 and damper 112, to flue gas duct 128. Duct 128 directs a flue gas output from air heater 108 combined with flue gas output from upflow contacting column 110', which has passed through the damper 112, into the particulate collection device 114. Flue gas 158 is output from upflow contacting column 110' and an input into duct 131; flue gas 160 is output from damper 112 and an input into duct 128; flue gas 156 is output from AH 108 and an input into duct 128; and flue gas 162 represents combined flue gas 156 and flue gas 160, which has been combined in duct 128 and is input to PCD 114. The second damper 112 is located between the flue gas output 107 of the upflow contacting column 110' and the flue gas duct 128 which directs flue gas output 156 of the air heater into the particulate collection device 114. Flue gas 158 is on the input side of second damper 112 and flue gas 160 is on the output side of damper 112. Flue gas 162 represents a combined flow of flue gas 156 from AH 108 and flue gas 160 from upflow contacting column output 107.

In some embodiments, the temperature of the flue gas 158 output by the upflow contacting column 110' is approximately within 150 degrees of the flue gas 156 output by the air heater 108. In one exemplary embodiment, the flue gas 158 is 300 degrees F.

Output flow 184 from FGD apparatus 118 travels through pipe 138 and enters separation device 120. Separation device 120 processes the received flow 184 and outputs filter cake 186 via pipe 140, recycled water 190 via pipe 136, and FGD blowdown 177 via pipe 137. The Recycled water 190 is directed back into the FGD apparatus 118. The FGD blowdown 177 is directed into the waste water holding tank 122. The waste water holding tank 122 combines the FGD blowdown 177 with other input waste water 192, which has been received via pipe 142. The outer waste water 192 is, e.g., from a waste water surface impoundment. The waste water holding tank 122 outputs fluid 194 including waste water and FGD blowdown via pipe 144, which is directed to the waste water input 105 of the upflow contacting column 110' and injected into the upflow contacting column via fluid injector 109.

The additive input 115' of the upflow contacting column 110 is downstream of the fluid 109 for the waste water input 105. In various embodiments, the additive received via the additive input includes one or more of recycled ash, lime, and cement. In various embodiments, the additive input to the upflow contacting column 110' via additive input 115 includes ash, e.g., recycled ash, obtained from particulate collection device 114. In various embodiments, the particulate collection device, e.g., PCD 114, from which ash is obtained processes the majority of the flue gas generated by a power plant in which said waste water processing system is being used.

The upflow contacting column 110' includes a cylindrical portion 119 downstream of the Venturi portion 113, and the cylindrical portion has a flue gas minimum velocity of at least 30 feet per second, e.g., to avoid particles dropping out of the flue gas. In various embodiments, the upflow contacting column has a length extending from the waste water injector 109 to the flue gas output 107 sufficient to cause a flue gas resident time in the upflow contacting column 110 of at least 0.5 seconds.

In the configuration of FIG. 2, which illustrates an exemplary waste water evaporation process including an upflow contacting column 110' in an exemplary system 200 in accordance with some embodiments of the present invention, the gas flow from the contacting column with entrained particulate matter (158, 160, a portion of 162) is introduced into PCD 114 that is shared with the main power plant. Since the slipstream flue gas (152, 154) was taken from the main power plant, cooled in the contacting column 110' and sent back (toward the PCD 114), the PCD of an existing power plant can be used as PCD 114. The mass and volume flow of flue gas and the particulate loading in the configuration of FIG. 2 will only be marginally higher than those seen by the PCD without the added evaporation process, e.g., a configuration without the upflow contacting column 110' (typically less than 2% and less than 20% respectively.) A part of the particulate matter collected in the PCD 114 is recycled to the contacting column 110' as recycled ash stream 176 which enters the contacting column 110' via input 115'. An additive such as lime is introduced into the bottom part of the contacting column 110' via inlet 204.

Figure 3:
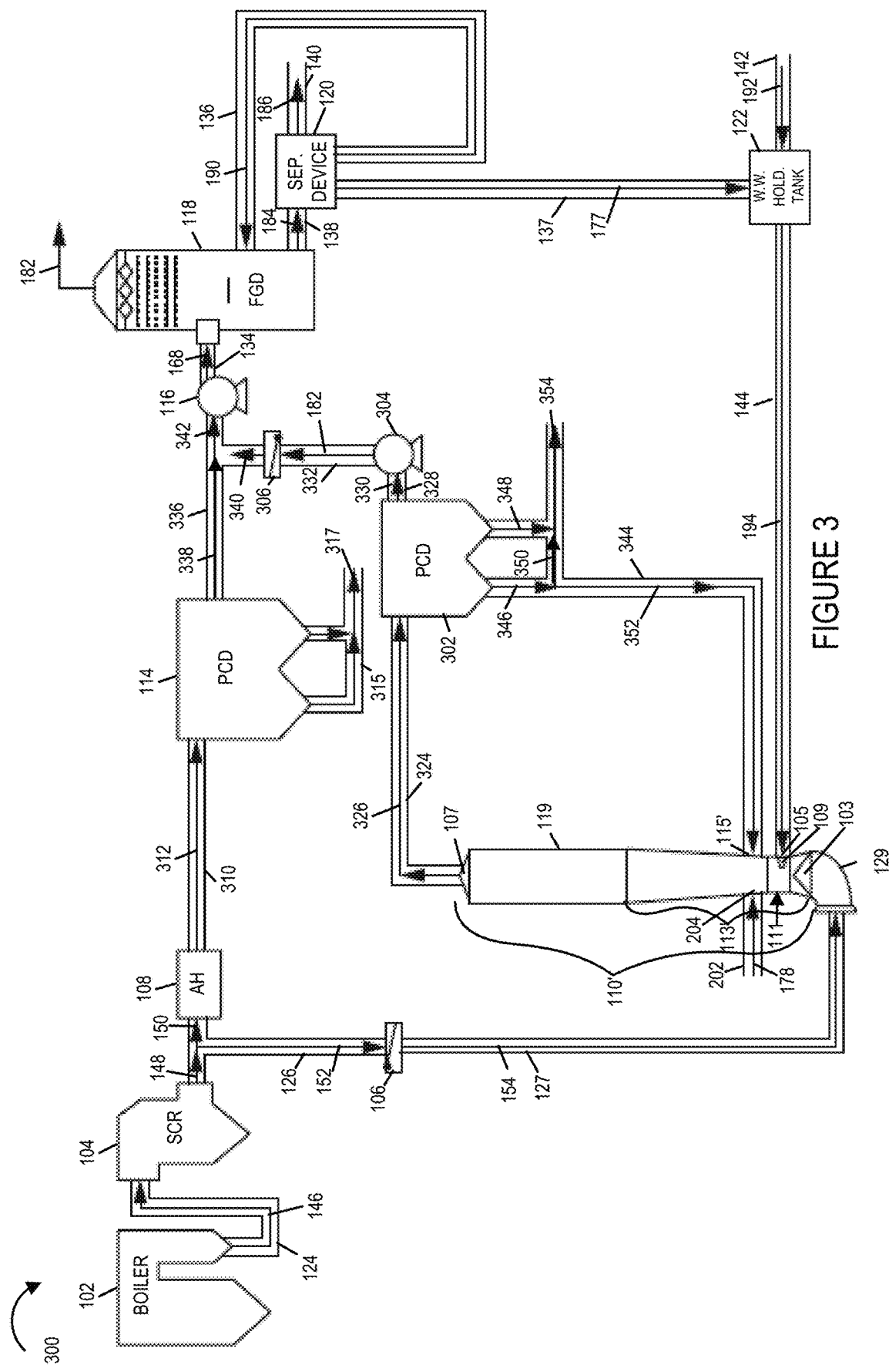
FIG. 3 is a drawing of an exemplary waste water processing system including two particulate collection devices in which an upflow contacting column is coupled to both an input and an output of the secondary particulate collection device in accordance with an exemplary embodiment.

FIG. 3 is a drawing 300 of an exemplary waste water processing system 300 in accordance with another exemplary embodiment. In the exemplary embodiment of FIG. 3, two particulate collection devices are included. Exemplary waste water processing system 300 includes a boiler 102, a selective catalytic reduction (SCR) apparatus 104, an air heater (AH) 108, an upflow contacting column 110', a first particulate collection device (PCD) 114, a first draft fan 116, a flue gas desulfurization (FGD) apparatus 118, a separation device 120, a waste water holding tank 122, a second particulate collection device (PCD) 302 and a second draft fan 304. In the exemplary embodiment of FIG. 3, the upflow contacting column 110' is coupled to both an input and an output of the second particulate collection device 302. In various embodiments, the first PCD 114 is one of an electrostatic precipitator or a bag filter. In various embodiments, the second PCD 302 is one of an electrostatic precipitator or a bag filter. In various embodiments, the secondary PCD 302 has different characteristics than the primary PCD 114.

The boiler 102 output is coupled to an input of SCR apparatus 104 via duct 124 through which output flue gas 146 flows. The SCR apparatus 104 receives flue gas 146, processes the received flue gas, e.g., performing a selective catalytic reduction operation, and outputs flue gas 148, said flue gas 148 includes flyash. The output of SCR 104 is coupled to an input of AH 108 and to an input 103 of the upflow contact column 110'. Duct 126 couples the output of SCR apparatus 104 to the input of AH 108 and to the input of damper 106. A first portion 150 of the flue gas 148 is input to the AH 108; a second portion 152 of flue gas 148 flows toward the upflow contacting column 110' and is input to the first damper 106. Flue gas 154, which is an output of damper 106, flows through duct 127, through connecting elbow 129 and enters the upflow contacting column 110' via input 103.

The upflow contacting column 110' includes output 107, which is coupled to a duct 324. Flue gas 326 which is output from output 107 of upflow contacting column 110' is input to second PCD 302.

Duct 328 couples an output of second PCD 302 to an input of second draft fan 304, and the output of second draft fan 304 is coupled to duct 332. Duct 332 is coupled to the input of second damper 306, and the output of second damper 306 is coupled to duct 336.

The output of AH 108 is coupled to the input of first PCD 114, via duct 312. Duct 336 couples the output of first PCD 114 and the output of second damper 306 to the input of first draft fan 116. Duct 134 couples the output of first draft fan 116 to the input of FGD apparatus 118.

Flue gas 312 output from AH 108 travels through duct 310 and is received by first PCD 114. First PCD 114 outputs flue gas 338 into duct 336. Flue gas 330 output from second PCD 302 into duct 328 is received by second draft fan 304, and output as flue gas 334 into duct 332. Flue gas 334 is received into second damper 306 and output into duct 336 as flue gas 340.

Flue gas 336 combines with flue gas 340 in duct 336 and is input to first draft fan 116 as flue gas 342. First draft fan 116 outputs flue gas 168 into duct 134, which is received as input by FGD apparatus 118. FGD apparatus 118 processes the input flue gas 168, and stack gas 182 emerges from FGD apparatus 118.

Piping 344 couples an ash output of the second PCD 302 to the additive input 115' of upflow contact column 110'. Ash (346, 348) is output from the second PCD 302. A first portion of ash 346, represented as ash flow 352 is routed toward first additive input 115' of upflow contacting column 110'. The ash flow 352, e.g., recycled ash, is input to the upflow contacting column 110' via first additive input 115'. A second portion 350 of ash 346 from the second PCD 302 is combined with ash 348, as represented by ash flow 354 and the combined ash flow 354 is routed for conditioning and/or disposal. Piping 315 conveys ash flow 317 from the first PCD 114 for conditioning and/or disposal.

In this exemplary embodiment, the upflow contacting column 110' includes a second additive input 204 in addition to first additive input 115'. Lime 178 travels through pipe 202 and is input to the upflow contacting column 110' via second additive input 204. In an alternative embodiment, multiple additives are combined and input to the upflow contacting column via a single input. For example, in some embodiments, system 300 includes upflow contacting column 110 instead of upflow contacting column 110', with input piping configured to accommodate a mixed additive, e.g., recycled ash and lime, being input via a single input on the upflow contacting column.

Piping 138 couples an output of FGD apparatus 118 to the input of separation device 120. Piping 136 couples an output of separation device 120 and to an input of FGD apparatus 118. Piping 137 couples an output of separation device 120 to an input of waste water holding tank 122. Piping 142 couples other waster sources to an input waste water holding tank 122. Piping 144 couples an output of waste water holding tank 122 to upflow contact column 110'.

The upflow contact column 110' includes flue gas input 103 for receiving a flue gas 154 having a temperature of at least 500 degrees F. In some embodiments, the temperature of flue gas 154 is approximately 700 degrees F. The upflow contact column 110' further includes a waste water input 105' for receiving waste water flow 194 from waste water holding tank 122 and a flue gas output 107 for outputting flue gas 326 toward second particulate collection device 302. The waste water input 105 is coupled to a fluid injector 109 positioned in a throat 111 of a Venturi portion 113 of the upflow contacting column 110' or in a sidewall of the throat 111 of the Venturi portion 113 of the upflow contacting column 110'. The flue gas within the upflow contacting column has a flue gas velocity exceeding 65 fps in the throat 111 of the Venturi portion 113 of the upflow contacting column 110' at a position where the fluid injector 109 is located.

Output flow 184 from FGD apparatus 118 travels through pipe 138 and enters separation device 120. Separation device 120 processes the received flow 184 and outputs filter cake 186 via pipe 140, recycled water 190 via pipe 136, and FGD blowdown 177 via pipe 137. The Recycled water 190 is directed back into the FGD apparatus 118. The FGD blowdown 177 is directed into the waste water holding tank 122. The waste water holding tank 122 combines the FGD blowdown 177 with other input waste water 192, which has been received via pipe 142. The waste water holding tank 122 outputs fluid 194 including waste water and FGD blowdown via pipe 144, which is directed to the waste water input 105 of the upflow contacting column 110' and injected into the upflow contacting column via fluid injector 109.

In the configuration of FIG. 3, which illustrates an exemplary waste water evaporation process including an upflow contacting column 110' in an exemplary system 300 in accordance with some embodiments of the present invention, a separate PCD 302 is used just for the evaporation process. A part of the particulate matter collected in the PCD 302 is recycled to the contacting column 110' as recycled ash flow 352 and enters the contacting column 110' via inlet 115'. An additive 178 such as lime is introduced separately via input 204. Alternatively, in some embodiments, the additive 178 is premixed with the recycled ash 352 and then introduced together into the upflow contacting column 110', e.g., via a single input. Alternatively, in some embodiments, the additive 178 is introduced at a flue gas inlet to the slipstream PCD 302.

In various embodiment system 300 is used in power plant system including first PCD 114 and second PCD 302. PCD 302 from which ash is obtained which is input to the upflow contacting column via input 115' processes flue gas output by the upflow contacting column 110' but not the majority of the flue gas output by the power plant in which the waste water processing system 300 is being used. First PCD 114 is used for processing a majority of the flue gas present in the power plant system, and the flue gas output 107 of the upflow contacting column 110' is coupled to second PCD 302 for processing the flue gas output of the upflow contacting column 110' and through which the majority of the flue gas present in the power plant system does not pass. Thus, in some embodiments using two PCD, the secondary PCD 302 collects more solid waste relative to ash, while the primary PCD 114 collects mostly ash making the primary PCD 114 a better source for clean ash when clean ash is desired.

Draft fan 304 is coupled to flue gas output of the second PCD 302 and propels flue gas 328 output by the second PCD 302 into a duct 336, e.g., via duct 332 and second damper 306, into which the output 338 of the primary PCD 114 flows.

Figure 4:
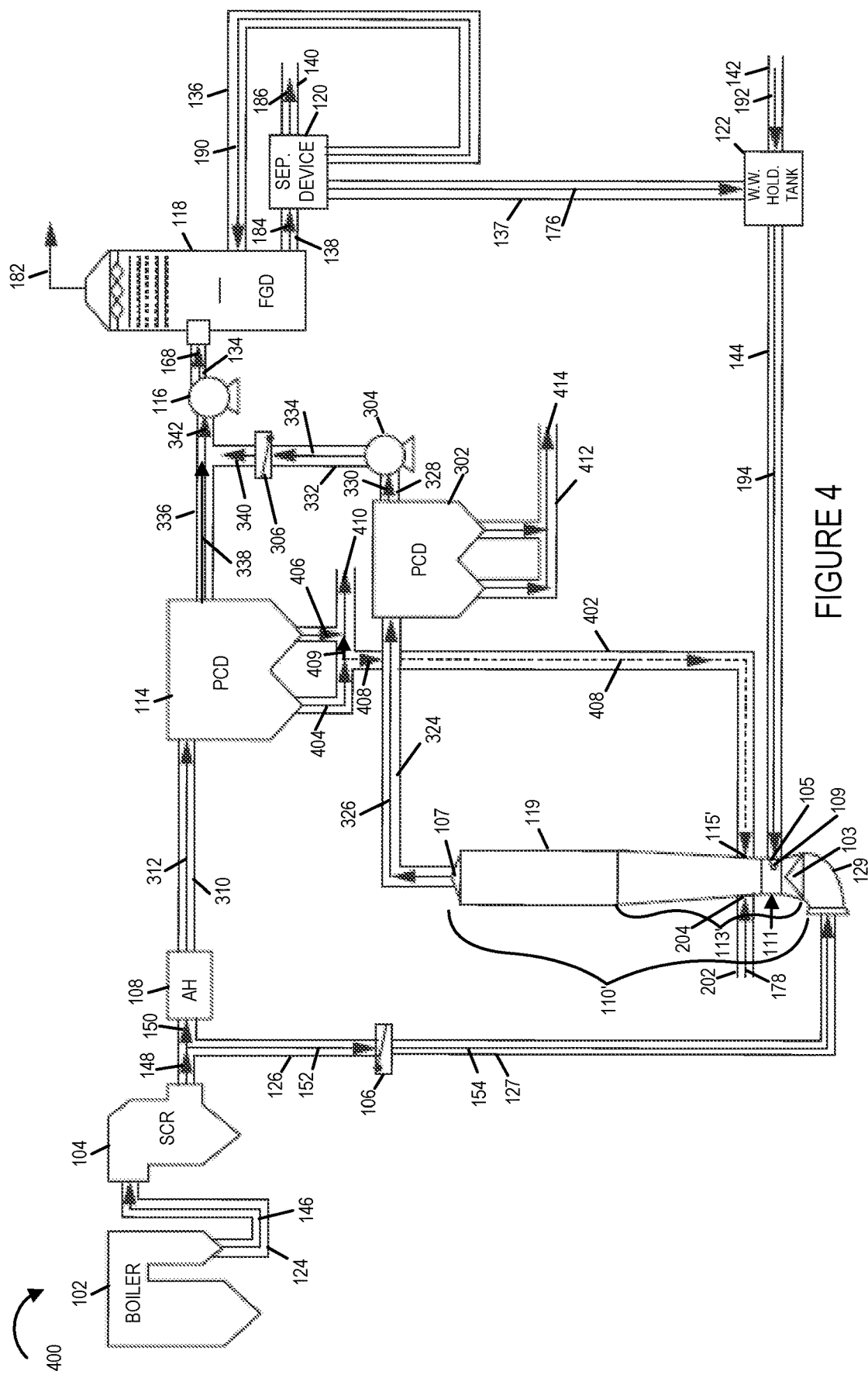
FIG. 4 is a drawing of an exemplary waste water processing system including two particulate collection devices in which an upflow contacting column is coupled to the an input of a first particulate collection device and an output of a second particulate collection device in accordance with an exemplary embodiment.

FIG. 4 is a drawing 400 of an exemplary waste water processing system 400 in accordance with another exemplary embodiment. In the exemplary embodiment of FIG. 4, two particulate collection devices are included. Exemplary waste water processing system 300 includes a boiler 102, a selective catalytic reduction (SCR) apparatus 104, an air heater (AH) 108, an upflow contacting column 110', a first particulate collection device (PCD) 114, a first draft fan 116, a flue gas desulfurization (FGD) apparatus 118, a separation device 120, a waste water holding tank 122, a second particulate collection device (PCD) 302 and a second draft fan 304. In the exemplary embodiment of FIG. 4, the upflow contacting column 110' is coupled to an input of the first particulate collection device 114 and an output of the second particulate collection device 302.

The boiler 102 output is coupled to an input of SCR apparatus 104 via duct 124 through which output flue gas 146 flows. The SCR apparatus 104 receives flue gas 146, processes the received flue gas, e.g., performing a selective catalytic reduction operation, and outputs flue gas 148, said flue gas 148 including flyash. The output of SCR 104 is coupled to an input of AH 108 and to an input 103 of the upflow contact column 110'. Duct 126 couples the output of SCR apparatus 104 to the input of AH 108 and to the input of first damper 106. A first portion 150 of the flue gas 148 is input to the AH 108; a second portion 152 of flue gas 148 flows toward the upflow contacting column 110' and is input to the first damper 106. Flue gas 154, which is an output of damper 106, flows through duct 127, through connecting elbow 129 and enters the upflow contacting column 110' via input 103.

The upflow contacting column 110' includes output 107, which is coupled to a duct 324. Flue gas 326 which is output from output 107 of upflow contacting column 110' is input to second PCD 302.

Duct 328 couples an output of second PCD 302 to an input of second draft fan 304, and the output of second draft fan 304 is coupled to duct 332. Duct 332 is coupled to the input of second damper 306, and the output of second damper 306 is coupled to duct 336.

The output of AH 108 is coupled to the input of first PCD 114, via duct 312. Duct 336 couples the output of first PCD 114 and the output of second damper 306 to the input of first draft fan 116. Duct 134 couples the output of first draft fan 116 to the input of FGD apparatus 118.

Flue gas 312 output from AH 108 travels through duct 310 and is received by first PCD 114. First PCD 114 outputs flue gas 338 into duct 336. Flue gas 330 output from second PCD 302 into duct 328 is received by second draft fan 304, and output as flue gas 334 into duct 332. Flue gas 334 is received into second damper 306 and output into duct 336 as flue gas 340.

Flue gas 336 combines with flue gas 340 in duct 336 and is input to first draft fan 116 as flue gas 342. First draft fan 116 outputs flue gas 168 into duct 134, which is received as input by FGD apparatus 118. FGD apparatus 118 processes the input flue gas 168, and stack gas 182 emerges from FGD apparatus 118.

Piping 402 couples an ash output of the first PCD 114 to the additive input 115' of upflow contact column 110'. Ash (404, 406) is output from the first PCD 114. A first portion of ash 404, represented as ash flow 408 is routed toward first additive input 115' of upflow contacting column 110'. The ash flow 408, e.g., recycled ash, is input to the upflow contacting column 110' via first additive input 115'. A second portion 409 of ash 404 from the first PCD 114 is combined with ash 406, as represented by ash flow 410, and the combined ash flow 410 is routed for conditioning and/or disposal. Piping 412 conveys ash flow 412 from the second PCD 302 for conditioning and/or disposal.

In this exemplary embodiment, the upflow contacting column 110' includes a second additive input 204 in addition to first additive input 115'. Lime 178 travels through pipe 202 and is input to the upflow contacting column 110' via second additive input 204. In an alternative embodiment, multiple additives are combined and input to the upflow contacting column via a single input. For example, in some embodiments, system 400 includes upflow contacting column 110 instead of upflow contacting column 110', with input piping configured to accommodate a mixed additive, e.g., recycled ash and lime, being input via a single input on the upflow contacting column.

Piping 138 couples an output of FGD apparatus 118 to the input of separation device 120. Piping 136 couples an output of separation device 120 and to an input of FGD apparatus 118. Piping 137 couples an output of separation device 120 to an input of waste water holding tank 122. Piping 142 couples other waster sources to an input waste water holding tank 122. Piping 144 couples an output of waste water holding tank 122 to upflow contact column 110'.

The upflow contact column 110' includes flue gas input 103 for receiving a flue gas 154 having a temperature of at least 500 degrees F. In some embodiments, the temperature of flue gas 154 is approximately 700 degrees F. The upflow contact column 110' further includes a waste water input 105' for receiving waste water flow 194 from waste water holding tank 122 and a flue gas output 107 for outputting flue gas 326 toward second particulate collection device 302. The waste water input 105 is coupled to a fluid injector 109 positioned in a throat 111 of a Venturi portion 113 of the upflow contacting column 110' or in a sidewall of the throat 111 of the Venturi portion 113 of the upflow contacting column 110'. The flue gas within the upflow contacting column has a flue gas velocity exceeding 65 fps in the throat 111 of the Venturi portion 113 of the upflow contacting column 110' at a position where the fluid injector 109 is located.

Output flow 184 from FGD apparatus 118 travels through pipe 138 and enters separation device 120. Separation device 120 processes the received flow 184 and outputs filter cake 186 via pipe 140, recycled water 190 via pipe 136, and FGD blowdown 177 via pipe 137. The Recycled water 190 is directed back into the FGD apparatus 118. The FGD blowdown 177 is directed into the waste water holding tank 122. The waste water holding tank 122 combines the FGD blowdown 177 with other input waste water 192, which has been received via pipe 142. The waste water holding tank 122 outputs fluid 194 including waste water and FGD blowdown via pipe 144, which is directed to the waste water input 105 of the upflow contacting column 110' and injected into the upflow contacting column via fluid injector 109.

In the configuration of FIG. 4, which illustrates an exemplary waste water evaporation process including an upflow contacting column 110' in an exemplary system 400 in accordance with some embodiments of the present invention, a part of the flyash from the main PCD 114 of the power plant is introduced into the upflow contacting column 110'. Recycled ash flow 408 which is a portion of combined ash output (404 and 406) from main PCD 114 is introduced into the upflow contacting column 110' via input 115'. An additive 178 such as lime is introduced into the bottom part of the upflow contacting column 110' via input 204. In some other embodiments, the additive stream 178 is premixed with the recycled ash stream 408 and then introduced together into the upflow contacting column 110'. Alternatively, in some other embodiments, the additive 178 is introduced at a flue gas inlet to the slipstream PCD 302 or at a flue gas inlet to the main PCD 114.

In various embodiment system 400 is used in a power plant system including first PCD 114 and second PCD 302. In this embodiment, the PCD 114 from which ash is obtained for the upflow contacting column 110' processes the majority of the flue gas generated by a power plant. The flue gas output of the upflow contacting column 110' is coupled to the second PCD 302 for processing the flue gas output 326 of the upflow contacting column 110' and through which the majority of the flue gas present in the power plant system does not pass. Thus, in some embodiments using two PCDs, the secondary PCD 302 collects more solid waste relative to ash, while the primary PCD 114 collects mostly ash making the primary PCD 114 a better source for clean ash when clean ash is desired.

Draft fan 304 is coupled to flue gas output of the second PCD 302 and propels flue gas 330 output by the second PCD 302 into a duct 336, e.g., via duct 332 and second damper 306, into which the output 338 of the primary PCD 114 flows.

In some embodiments, an exemplary waste water processing system in accordance with the present invention does not include a SCR, e.g., SCR 104 is omitted from system 100 of FIG. 1, system 200 of FIG. 2, system 300 of FIG. 3, and/or system 400 of FIG. 4. Thus in some such embodiments, a portion of the flue gas 146 output from boiler 102 is taped off and directed into the upflow contacting column 110 or 110'. However, in the various embodiments, with and without a SCR 104, the flue gas which is directed to the inlet of upflow contacting column (110 or 110') is tapped off upstream of the air heater 108 so that a high temperature gas flow enters the upflow contacting column (110 or 110').

In some embodiments, the flue gas entering the upflow contacting column (110 or 110') is approximately 700 degrees F. and flue gas exiting the upflow contacting column is approximately 300 degrees F. In some embodiments, the waste water which is input to the upflow contacting column (110 or 110') includes approximately 80% water and 20% dissolved solids.

Figure 5A:
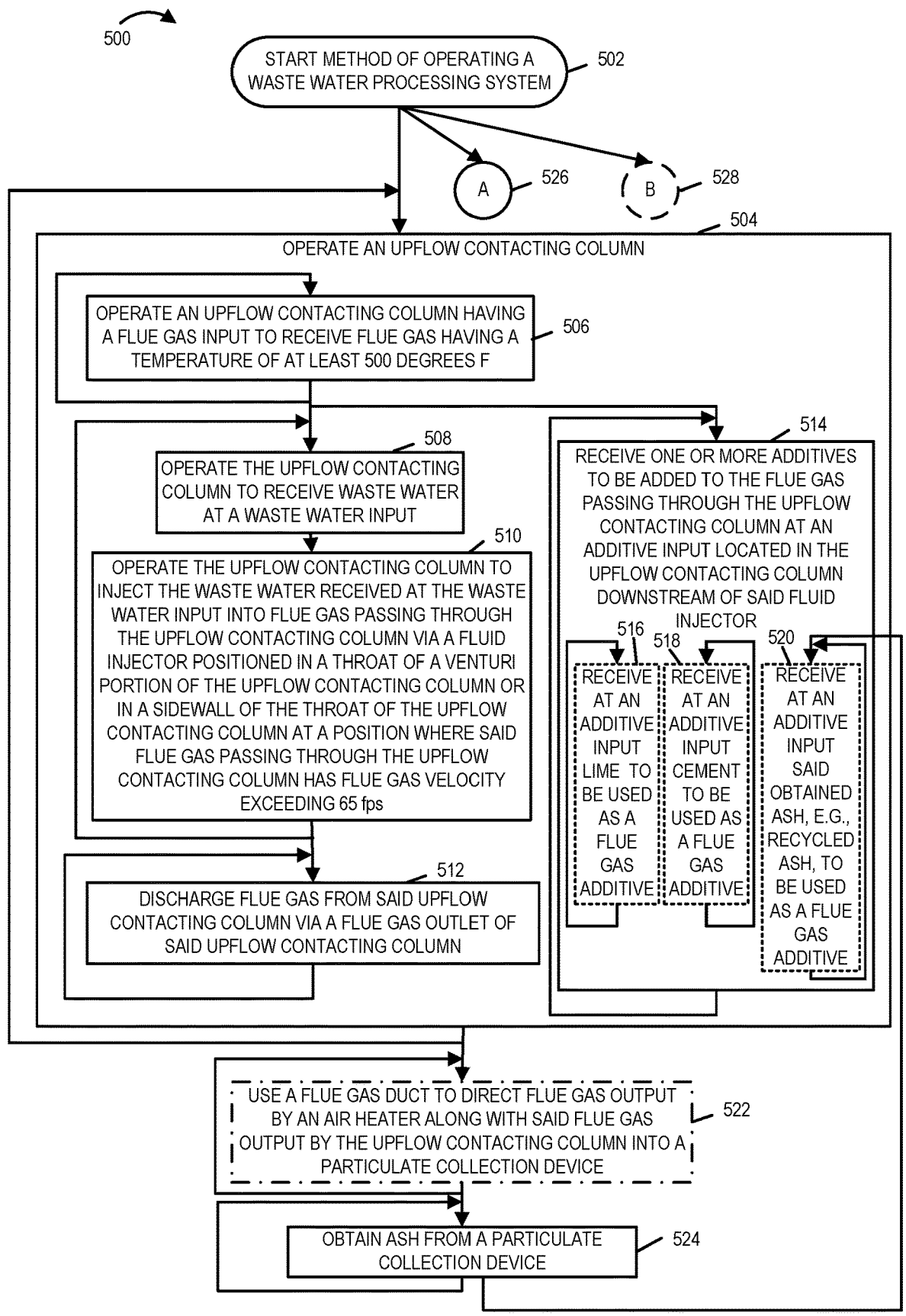
FIG. 5A is a first part of a flowchart of an exemplary method of operating a waste water processing system in accordance with an exemplary embodiment.
Figure 5B:
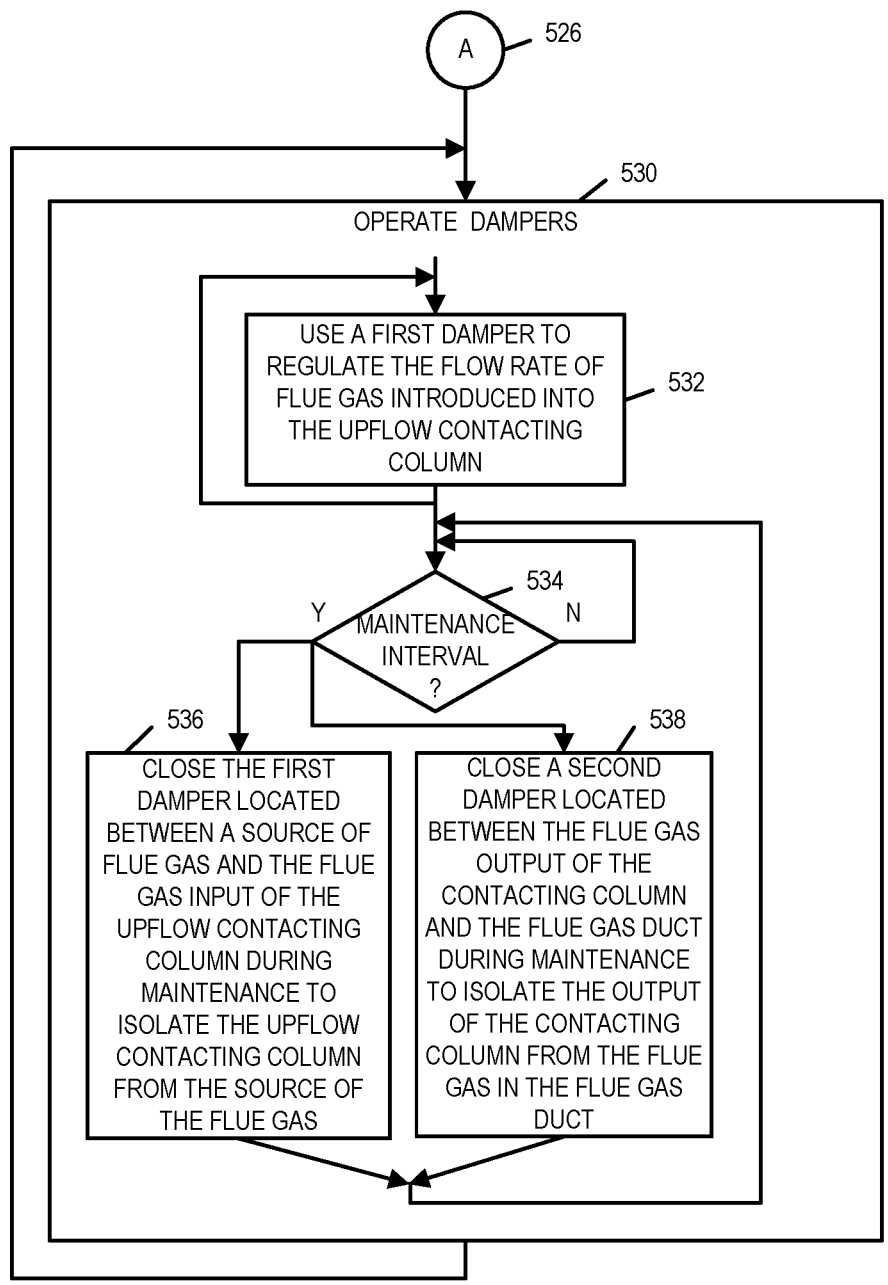
FIG. 5B is a second part of a flowchart of an exemplary method of operating a waste water processing system in accordance with an exemplary embodiment.
Figures 5, 5C:
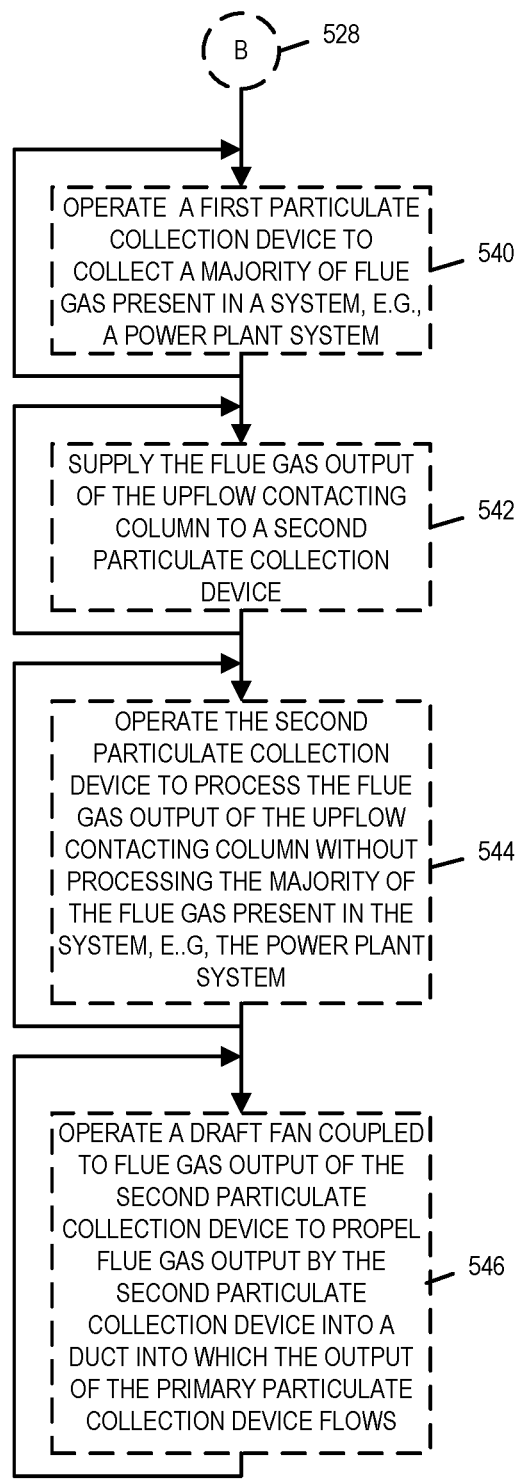
FIG. 5C is a third part of a flowchart of an exemplary method of operating a waste water processing system in accordance with an exemplary embodiment.
FIG. 5 comprises the combination of FIG. 5A, FIG. 5B and FIG. 5C.

FIG. 5, comprising the combination of FIG. 5A, FIG. 5B and FIG. 5C, is flowchart of an exemplary method of operating a waste water processing system in accordance with an exemplary embodiment. The waste water processing system implementing the method of flowchart 500 of FIG. 5 is, e.g., one of system 100 of FIG. 1, system 200 of FIG. 2, system 300 of FIG. 3 or system 400 of FIG. 4. Operation starts in step 502, in which the waste water processing system is turned on. Operation proceeds from step 502 to step 504 and to step 530, via connecting node A 526. In some embodiments, operation also proceeds from step 502, via connecting node B 528 to step 540.

In step 504 an upflow contacting column, e.g., upflow contacting column 110 or 110', is operated. Step 504 includes steps 506, 508, 510, 512 and 514. In step 506 the upflow contacting column, having a flue gas input, is operated to receive flue gas having a temperature of at least 500 degrees F. In some embodiments, the temperature of the flue gas at the flue gas input of the upflow contacting column is approximately 700 degrees F. Operation proceeds from step 506 to step 508 and step 514. In step 508 the upflow contacting column is operated to receive waste water at a waste water input. In some embodiments, the waste water received at the waste water input of the upflow contacting column has suspended solids and dissolved solids. Operation proceeds from step 508 to step 510. In step 510 the upflow contacting column is operated to inject the waste water received at the waste water input into flue gas passing through the upflow contacting column via a fluid injector positioned in a throat of a Venturi portion of the upflow contacting column or in a sidewall of the throat of the upflow contacting column at a position where said flue gas passing through the upflow contacting column has a flue gas velocity exceeding 65 fps. In various embodiments, the upflow contacting column includes a cylindrical portion downstream of the Venturi portion, said cylindrical portion having a flue gas minimum velocity of at least 30 feet per second (fps), e.g., to avoid particles dropping out of the flue gas. In some embodiments, the upflow contacting column has a length extending from the waste water injector to the flue gas output sufficient to cause a flue gas residence time in the upflow contacting column of at least 0.5 seconds. Operation proceeds from step 510 to step 512. In step 512 flue gas is discharged from the upflow contacting column via a flue gas outlet of said upflow contacting column. In various embodiments, the flue gas which is output from the upflow contacting column includes water vapor and a solid waste product, said solid waste product comprising solids derived from the waste water and the flyash carried in the flue gas input to the upflow contacting column. In some embodiments, the solid waste product has less than 6% water content.

Returning to step 514, in step 514 one or more additives to be added to the flue gas passing through the upflow contacting column are received at an additive input(s) located in the upflow contacting column downstream of the fluid injector. In some embodiments, an additive received via said additive input includes one or more of recycled ash, lime, and cement. In some embodiment, step 514 includes one or more or all of steps 516, 518 and 520. In step 516 lime to be used as a flue gas additive is received at an additive input. In step 518, cement to be used as flue gas additive is received at an additive input. In step 520 obtained ash, e.g., recycled ash, to be used as a flue gas additive is received at an additive input. In some embodiments, different additives are received at different additive inputs in the upflow contacting column. For example, recycled ash may be received via a first additive input and lime may be received via a second additive input. In some embodiments, an additive mixture, e.g., a mixture of recycled ash and lime, is received via a single additive input in the uplow contacting column.

In some embodiments, operation proceeds from step 504 to step 522; in other embodiments, operation proceeds from step 504 to step 524. In various embodiments, the flue gas output of the upflow contacting column is coupled to a flue gas duct, and in step 522 the flue gas duct is used to direct flue gas output by an air heater along with flue gas output by the upflow contacting column into a particulate collection device. In some embodiments, the temperature of the flue gas output by the upflow contacting column is approximately the temperature of the flue gas output by the air heater, e.g., the flue gas output from the upflow contacting column is within 150 degree F. of the flue gas output by the air heater. Operation proceeds from step 522 to step 524 in which ash is obtained from a particulate collection device. Obtained ash from the particulate collection device, in some embodiments, is directed to an additive input of the upflow contacting column and received in step 520.

In some embodiments, the particulate collection device from which ash is obtained processes the majority of the flue gas generated by a power plant in which the waste water processing system is being used. For example; in system 100 of FIG. 1, recycled ash 176 is obtained from PCD 114; in system 200 of FIG. 2, recycled ash 176 is obtained from PCD 114; and in system 400 of FIG. 4, recycled ash 408 is obtained from PCD 114.

In some embodiments, the particulate collection device from which ash is obtained processes flue gas output by the upflow contacting column but not the majority of the flue gas output by a power plant in which said waste water processing system is being used. For example, in system 300 of FIG. 300 recycled ash 352 is obtained from second PCD 302, which processes the flue gas output from the upflow contacting column 110'; while first PCD 114 processes the majority of the flue gas output by the power plant.

Returning to step 530, in step 530 dampers in the waste water processing system are operated. Step 530 includes steps 532, 534, 536 and 538. In step 532 a first damper is used to regulate the flow rate of flue gas introduced into the upflow contacting column. Operation proceeds from step 532 to step 534. In step 534 a determination is made as to whether or not the current time corresponds to a maintenance interval or system shutdown. If the current time does not correspond to a maintenance interval, then operation proceeds from the output of step 534 to the input of 534 for another determination at a subsequent time. However, if the determination of step 534 is that the current time corresponds to a maintenance interval, then operation proceeds from step 534 to steps 536 and 538. In step 536 the first damper, located between a source of the flue gas and the flue gas input of the upflow contacting column, is closed during maintenance to isolate the upflow contacting column from the source of the flue gas. In some embodiments, the source of the flue gas which is input to the upflow contacting column is a boiler output or and SCR output. In step 538 a second damper, located between the flue gas output of the upflow contacting column and flue gas duct, is closed during maintenance to isolate the output of the upflow contacting column form the flue gas in the flue gas duct. Operation proceeds from steps 536 and 538 to the input of step 534 for another determination at a subsequent time.

In some embodiments, the method of flowchart 500 is used in a system, e.g., a power plant system, including a first particulate collection device, e.g., PCD 114, and a second particulate collection device, e.g., PCD 302. Returning to step 540, in step 540 a first particulate collection device is operated to collect a majority of flue gas present in a system, e.g., a power plant system. Operation proceeds from step 540 to step 542 in which the flue gas output of the upflow contacting column is supplied to a second particulate collection device. Operation proceeds from step 542 to step 544. In step 544 the second particulate collection device is operated to process the flue gas output of the upflow contacting column without processing the majority of the flue gas present in the system, e.g., present in the power plant system. In some such embodiments, the second particulate collection device collects more solid waste relative to ash while the first, e.g., primary, particulate collection device collects mostly ash making the first, e.g., primary PCD a better source of clean ash when clean ash is desired. Operation proceeds from step 544 to step 546. In step 546 a draft fan coupled to the flue gas output of the second particulate collection device is operated to propel flue gas output by the second particulate collection device into a duct into which the output of the particulate collection device flows Numerous additional variations on the methods and apparatus of the present invention described above will be apparent to those skilled in the art in view of the above description of the invention. Such variations are to be considered within the scope of the invention.

What is claimed is:

1. A waste water processing system, comprising:
an upflow contacting column having a flue gas input for receiving flue gas having a temperature of at least 500 degrees F., a waste water input and a flue gas output, said waste water input being coupled to a fluid injector positioned in a throat of a Venturi portion of said upflow contacting column or in a sidewall of the throat of the Venturi portion of said upflow contacting column, said flue gas having a flue gas velocity exceeding 65 fps in said throat of the Venturi portion of said upflow contacting column at a position where the fluid injector is located,
wherein the flue gas output is coupled to a flue gas duct which directs a flue gas output of an air heater into a particulate collection device.

2. The waste water processing system of claim 1, further comprising:
a first damper located between a source of flue gas and the flue gas input of said upflow contacting column; and
a second damper located between the flue gas output of said contacting column and said flue gas duct which directs flue gas output of the air heater into the particulate collection device.

3. The waste water processing system of claim 1, wherein the temperature of the flue gas output by the upflow contacting column is approximately the temperature of the flue gas output by the air heater.

4. The waste water processing system of claim 3,
wherein the waste water input receives waste water having suspended solids and dissolved solids; and
wherein the flue gas output includes water vapor and a solid waste product, the solid waste product comprising solids derived from the waste water and flyash carried in the flue gas input.

5. The waste water processing system of claim 1, wherein the upflow contacting column includes an additive input downstream of said fluid injector for waste water input.

6. The waste water processing system of claim 5, wherein an additive received via said additive input includes one or more of recycled ash, lime, and cement.

7. The waste water processing system of claim 1 wherein said upflow contacting column includes a cylindrical portion downstream of said Venturi portion, said cylindrical portion having a flue gas minimum velocity of at least 30 feet per second.

8. The waste water processing system claim 6, wherein the upflow contacting column has a length extending from the waste water injector to the flue gas output sufficient to cause a flue gas residence time in the upflow contacting column of at least 0.5 seconds.

9. A waste water processing system, comprising:
an upflow contacting column having a flue gas input for receiving flue gas having a temperature of at least 500 degrees F., a waste water input and a flue gas output, said waste water input being coupled to a fluid injector positioned in a throat of a Venturi portion of said upflow contacting column or in a sidewall of the throat of the Verturi portion of said upflow contacting column, said flue gas having a flue gas velocity exceeding 65 fps in said throat of the Venturi portion of said upflow contacting column at a position where the fluid injector is located, wherein said system is part of a power plant system including a first particulate collection device used for processing a majority of flue gas present in the power plant system; and wherein the flue gas output of the upflow contacting column is coupled to a second particulate collection device for processing the flue gas output of the upflow contacting column and through which the majority of flue gas present in the power plant system does not pass.

10. The waste water processing system of claim 9, further comprising:

a draft fan coupled to a flue gas output of the second particulate collection device for propelling flue gas output by the secondary particulate collection device into a duct into which the output of the first particulate collection device flows.

\* \* \* \* \*